United States Patent [19]

Clow

[11] 4,096,980
[45] Jun. 27, 1978

[54] UNIVERSAL MOUNTING MOTORCYCLE SADDLEBAG BRACKET

[75] Inventor: William E. Clow, Los Alamitos, Calif.

[73] Assignee: Kimstock, Inc., Santa Ana, Calif.

[21] Appl. No.: 772,449

[22] Filed: Feb. 14, 1977

[51] Int. Cl.² .............................................. B62J 11/00
[52] U.S. Cl. ................................ 224/39; 224/32 A; 248/223.4; 280/289 A
[58] Field of Search ................... 224/30 R, 31, 32 R, 224/32 A, 39, 41, 43, 44, 42.45 R, 42.46 R; 280/202, 289 R, 289 A, 284; 248/222.1, 223.1, 223.4, 225.1, 311.1, 360

[56] References Cited

U.S. PATENT DOCUMENTS

| | | | |
|---|---|---|---|
| 1,154,197 | 9/1915 | Musselman | 224/32 A |
| 3,019,709 | 2/1962 | Teason | 248/223.4 X |
| 3,346,156 | 10/1967 | Jones | 224/32 R |
| 3,625,405 | 12/1971 | Kezar | 280/202 X |
| 3,795,354 | 3/1974 | Stippich | 224/32 A |

FOREIGN PATENT DOCUMENTS

| | | | |
|---|---|---|---|
| 741,029 | 12/1932 | France | 224/32 A |
| 891,205 | 9/1953 | Germany | 280/202 |
| 314,261 | 1/1934 | Italy | 280/202 |
| 74,353 | 11/1948 | Norway | 224/39 |

Primary Examiner—Trygve M. Blix
Assistant Examiner—Winston H. Douglas
Attorney, Agent, or Firm—Edward A. Sokolski

[57] ABSTRACT

A mounting bracket for a saddlebag or the like has a bar member which is slotted to form a track in which a flat head portion of a specially designed bolt member rides. The bar member has elongated slots formed therein through which bolts are placed for attaching the bar member to the wall of a saddlebag, the bar member thus being adjustable as to position relative to the saddlebag along the longitudinal axis of the bar member. Offset bracket members and spacers as required are either fixedly attached to the bar member or attached by means of flat headed bolt members which ride in the track and are adjustably positioned therealong. A strut is attached to the first flat headed bolt member, this strut being attached at the other end thereof to the foot peg of the cycle, with or without use of an offset bracket as may be needed. One of the offset brackets is attached to the end of one of the rear shock mounts of the cycle. The range of adjustment afforded by means of the flat headed bolt member which rides in the bar member track enables the use of the same bracket assembly for a great variety of motorcycles or other equipment with which the bracket may be used.

5 Claims, 3 Drawing Figures

U.S. Patent    June 27, 1978    4,096,980
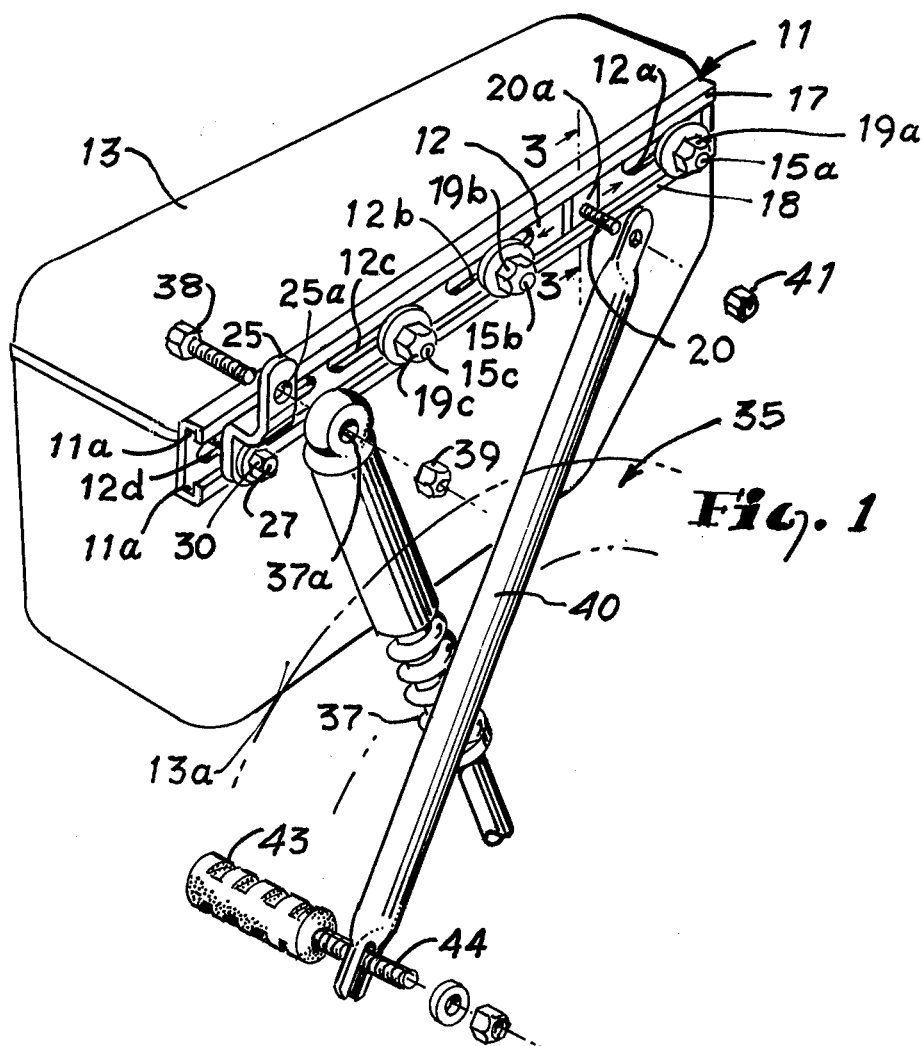
Fig. 1
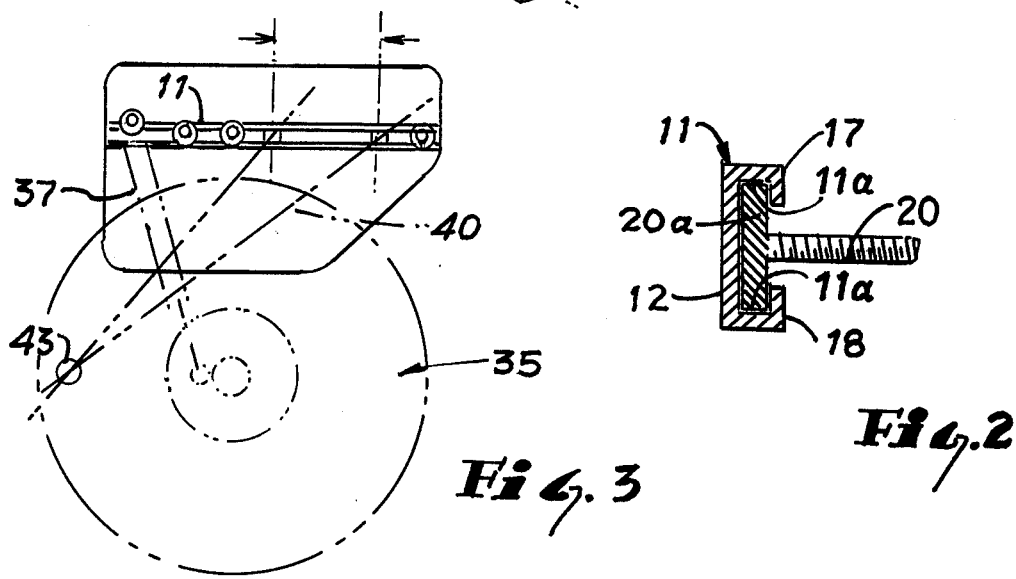
Fig. 2
Fig. 3

UNIVERSAL MOUNTING MOTORCYCLE SADDLEBAG BRACKET

This invention relates to universal mounting brackets for motorcycle saddlebags and the like, and more particularly to such a device employing a track member in which the support struts and brackets can be adjustably positioned to accommodate a variety of installations.

In the mounting of saddlebags on motorcycles, in view of the many different models of cycles as well as different types of mountings which any individual may desire, it is necessary for the dealer to stock a great variety of mounting brackets to suit the needs of different customers. This makes for extra expense and inventorying for the dealer, and further increases the cost of producing such items in view of the separate tooling and parts fabrication required for the many different sizes and types of brackets needed.

The device of the present invention obivates the need for stocking a wide variety of brackets by providing a universal bracket which can be adapted for use with a great variety of different brands and types of motorcycles. The device of the present invention also permits wide latitude in the positioning of the saddlebag for best rider comfort, least wind resistance and proper clearances. This end result is achieved in a simple and economical device which can be readily installed in the field with a minimum amount of difficulty.

It is therefore an object of this invention to facilitate the mounting of saddlebags and the like on motorcycles or other devices.

It is a further object of this invention to provide a highly economical motorcycle saddlebag bracket which can be used with a great variety of different models and types of motorcycles with a wide range of positioning adjustment.

Other objects of this invention will become apparent as the description proceeds in connection with the accompaying drawings, of which:

FIG. 1 is a perspective view illustrating a preferred embodiment of the invention in connection with a typical installation on a motorcycle;

FIG. 2 is a cross-sectional view taken along the plane indicated by —in FIG. 1; and FIG. 3 is a schematic view illustrating the range of adjustment of which the embodiment illustrated in FIG. 1 is capable.

Briefly described, my invention is as follows: A bar member is slotted to provide a horizontal track along its length. Mounted in the track for slidable positioning within the track are flat headed T-bolt members. The bar member also has a plurality of elongated slots formed therein. These slots have bolts fitted therethrough which are used to secure the bar member to a side wall of a motorcycle saddlebag. The slots also permit adjustment of the position of the saddlebag relative to the bar member along the longitudinal axis of the bar member. Three identical offset brackets are provided. One offset bracket is secured to the upper mount of the motorcycle's rear shock absorber. Another is secured to any suitable tab on the motorcycle such as the rear directional signal mounting bracket. Using spacers provided for alignment purposes, the horizontal bar member is attached to the spacers by means of flat headed "T" bolts which can be positioned at any point along the length of the horizontal bar. The elongated head of the "T" bolt which slides in the "C" shaped slot in the horizontal bar members prevents it from turning or moving when the mounting bolts are tightened. A "T" bolt is also used to secure a diagonally positioned tubular strut with flattened ends and slots punched therein for adjustment purposes. The strut is normally attached to the footpeg, using, if necessary, the third offset bracket provided for purposes of insuring adequate clearance between the strut and the coil spring surrounding the shock absorber. The bag is mounted to the horizontal cross member by bolting through the slots in the horizontal bar member. Upon final positioning all bolts are secured tightly. To provide additional rigidity, a hole is drilled in the bag on the inside sidewall near the bottom for clamping the bag to the strut.

Referring now to FIGS. 1 and 2, a preferred embodiment of the invention is shown as being used to mount a saddlebag on a motorcycle. Bar member 11 which may be fabricated of aluminum has slots 11a which may be extruded therein, to form a track running along the longitudinal extent thereof. Bar 11 has a flat back portion 12 having a plurality of elongated slots 12a–12d formed therein. Fitted through apertures (not shown) formed in the side wall 13a of saddlebag 13, and also through slots 12a–12c are bolts 15a–15c respectively. Bolts 15a–15c are retained against the walls of track runners 17 and 18 by means of nuts 19a–19c respectively. Runners 17 and 18 form lip portions which run along the front edge of the bar opposite back portion 12 with slots 11a being formed between the runners and the back portion. Slidably supported in slots 11a is a rectangular flat head portion 20a of bolt 20, as can be seen by additional reference to FIG. 2. Offset bracket 25 is fixedly attached to bar 11 by means of bolt 27 which is fitted through an aperture in saddlebag wall 13a, slot 12d of the bar and an aperture (not shown) in bracket 25. Nut 30 is utilized to secure bolt 27. If so desired, bracket 25 may be made slidably adjustable along the track by employing a flat headed bolt similar to bolt 20 for mounting the bracket in slots 11a.

The saddlebag is mounted on a motorcycle 35 by attaching offset bracket 25 to the top end of shock absorber 37 by means of bolt 38 and nut 39, bolt 38 passing through aperture 25a in the bracket and aperture 37a in the shock absorber; and by attaching one end of strut 40 to bolt 20 by means of nut 41 and the other end of strut 40 to the axle 44 of foot peg 43 of the motorcycle. The slidable positioning of bolt 20 in the track formed by slots 11a affords a range of adjustment to accommodate installation on different types of motorcycles as indicated in FIG. 3. An even greater adjustment range could be afforded if need be by utilizing a flat headed bolt similar to bolt 20 for mounting bracket 25 in place of conventional bolt 27.

It is to be noted that while the invention has been described in conjunction with the mounting of a saddlebag on a motorcycle, it should be apparent that it can also be used for other purposes.

While the invention has been described and illustrated in detail, it is to be clearly understood that this is intended by way of illustration and example only and is not to be taken by way of limitation, the spirit and scope of this invention being limited only by the terms of the following claims.

I Claim:

1. A bracket assembly for mounting a saddlebag on a motorcycle comprising:
   an elongated bar member, said bar member having a flat back portion and a front portion formed by a pair of strips running substantially parallel to said back portion with a slot being formed between each of said strips and said back portion, said slots forming a C-shaped track, a flat headed "T" bolt having its head portion supported in said slots for adjustable positioning along said track;

means for attaching said bar member to the saddlebag;

bracket means mounted on said bar member and spaced along the track from the flat headed bolt for attaching the bar member to a first portion of the motorcycle; and strut means attached at one end to said flat headed bolt and at the other end to a second portion of the motorcycle, the head portion of said flat headed bolt being adapted to be adjustably positioned along said track to an optimum position for supporting the saddlebag on the motorcycle.

2. The assembly of claim 1 wherein said bracket means is an offset bracket which is attached to one end of a shock mount of said motorcycle.

3. The assembly of claim 1 wherein the other end of said strut is attached to the foot peg of the motorcycle.

4. The assembly of claim 1 wherein the back portion of said bar has a plurality of elongated slots formed therein to permit adjustable positioning of said bar along the saddlebag, the means for attaching said bar to the saddlebag comprising bolts which pass through a wall of said saddlebag in said elongated slots.

5. The assembly of claim 1 wherein the head portion of said flat headed bolt is rectangular.

* * * * *